United States Patent
Watanabe et al.

(10) Patent No.: US 10,291,054 B2
(45) Date of Patent: May 14, 2019

(54) FUEL CELL SYSTEM

(71) Applicant: TOYOTA JIDOSHA KABUSHIKI KAISHA, Toyota-shi, Aichi-ken (JP)

(72) Inventors: Takao Watanabe, Nagakute (JP); Akihiro Kamiya, Toyota (JP); Kenji Umayahara, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 155 days.

(21) Appl. No.: 15/488,682

(22) Filed: Apr. 17, 2017

(65) Prior Publication Data

US 2017/0310142 A1 Oct. 26, 2017

(30) Foreign Application Priority Data

Apr. 22, 2016 (JP) ................. 2016-085783

(51) Int. Cl.
*H02J 7/00* (2006.01)
*H01M 8/04302* (2016.01)
(Continued)

(52) U.S. Cl.
CPC ......... *H02J 7/0091* (2013.01); *B60L 11/1887* (2013.01); *H01M 8/0432* (2013.01); *H01M 8/0494* (2013.01); *H01M 8/04302* (2016.02); *H01M 8/04373* (2013.01); *H01M 8/04567* (2013.01); *H01M 8/04582* (2013.01);
(Continued)

(58) Field of Classification Search
CPC ................... B60L 11/1881–11/1898
See application file for complete search history.

(56) References Cited

U.S. PATENT DOCUMENTS 7,846,568 B2 * 12/2010 Norimatsu ........ H01M 8/04223
429/9
2006/0222909 A1 10/2006 Aoyagi et al.
(Continued)

FOREIGN PATENT DOCUMENTS

DE  10 2014 224 890 A1  1/2016
EP      1 806 248 A1     7/2007
(Continued)

*Primary Examiner* — Rexford Barnie
*Assistant Examiner* — David Shiao
(74) *Attorney, Agent, or Firm* — Finnegan, Henderson, Farabow, Garrett & Dunner, LLP

(57) ABSTRACT

On a start of a fuel cell system, (i) when the temperature of a high-voltage secondary battery obtained from a temperature sensor is higher than a predetermined reference value, a controller of the fuel cell system is configured to set an output voltage on a step-down side of a DC-DC converter to a higher voltage than a voltage of a low-voltage secondary battery and subsequently start an FC auxiliary machine using electric power from the high-voltage secondary battery. (ii) When the temperature of the high-voltage secondary battery obtained from the temperature sensor is equal to or lower than the predetermined reference value, on the other hand, the controller of the fuel cell system is configured to set the output voltage on the step-down side of the DC-DC converter to a lower voltage than the voltage of the low-voltage secondary battery and subsequently start the FC auxiliary machine using the electric power from the high-voltage secondary battery.

20 Claims, 9 Drawing Sheets

(51) Int. Cl.
*B60L 11/18* (2006.01)
*H01M 8/0432* (2016.01)
*H01M 8/04537* (2016.01)
*H01M 8/04858* (2016.01)
*H01M 10/42* (2006.01)
*H01M 10/46* (2006.01)
*H01M 10/48* (2006.01)
*H01M 16/00* (2006.01)
*H01M 8/04828* (2016.01)
*H01M 8/04955* (2016.01)
*H01M 10/44* (2006.01)
*H02J 7/14* (2006.01)

(52) U.S. Cl.
CPC ... *H01M 8/04589* (2013.01); *H01M 8/04888* (2013.01); *H01M 8/04955* (2013.01); *H01M 10/425* (2013.01); *H01M 10/441* (2013.01); *H01M 10/46* (2013.01); *H01M 10/486* (2013.01); *H01M 16/006* (2013.01); *H02J 7/0054* (2013.01); *H02J 7/0063* (2013.01); *H02J 7/1438* (2013.01); *H02J 7/1453* (2013.01); *H01M 2220/20* (2013.01); *H01M 2250/20* (2013.01); *H02J 2007/0067* (2013.01); *Y02T 90/32* (2013.01)

(56) References Cited

U.S. PATENT DOCUMENTS

| | | | |
|---|---|---|---|
| 2008/0248351 A1* | 10/2008 | Wake | H01M 8/04097 429/413 |
| 2008/0290832 A1* | 11/2008 | Wake | H01M 8/04223 320/101 |
| 2013/0049684 A1 | 2/2013 | Kusch et al. | |
| 2014/0302415 A1* | 10/2014 | Peterson | H01M 8/04037 429/434 |
| 2014/0342258 A1* | 11/2014 | Burch | H01M 8/04007 429/429 |
| 2015/0372329 A1 | 12/2015 | Jomori et al. | |
| 2015/0380788 A1 | 12/2015 | Kazuno | |
| 2016/0006059 A1* | 1/2016 | Kwon | B60L 11/1892 429/434 |
| 2016/0084916 A1 | 3/2016 | Kim et al. | |
| 2017/0294666 A1* | 10/2017 | Kim | H01M 8/04303 |

FOREIGN PATENT DOCUMENTS

| | | |
|---|---|---|
| JP | 2006-112386 A | 4/2006 |
| JP | 2010-110188 | 5/2010 |
| JP | 2011-072081 A | 4/2011 |
| JP | 2014-192965 | 10/2014 |
| WO | WO2007/125673 A1 | 11/2007 |
| WO | WO2007/149409 A2 | 12/2007 |

* cited by examiner

FUEL CELL SYSTEM

CROSS-REFERENCE TO RELATED APPLICATIONS

The present application claims priority from Japanese patent application 2016-85783 filed on Apr. 22, 2016, the content of which is hereby incorporated by reference into this application.

BACKGROUND

Field

The present disclosure relates to a fuel cell system.

Related Art

JP 2010-110188A describes a fuel cell system that is mounted on a vehicle and includes a fuel cell, an air compressor, a battery and a control device. The electric power of the battery is supplied to a motor for driving and is also supplied to the air compressor. This battery used is a high-voltage secondary battery having a higher output voltage than a lead acid battery that is mounted on a conventional vehicle a vehicle without a fuel cell). A low-voltage secondary battery such as a lead acid battery may be mounted on the fuel cell vehicle, as the power source of the control device to control various motors and the air compressor. In the conventional vehicle, the lead acid battery is charged with electric power generated by an alternator. In the fuel cell vehicle, on the other hand, the low-voltage secondary battery is charged with electric power supplied from the fuel cell or the high-voltage secondary battery.

The fuel cell generates electric power by a chemical reaction. When the fuel cell vehicle is started, there is accordingly a time lag to start power generation. During this time duration, electric power is supplied from the high-voltage secondary battery to the air compressor and is supplied from the low-voltage secondary battery to the control device. In order to prevent the low-voltage secondary battery from running out, electric power is supplied from the high-voltage secondary battery to the low-voltage secondary battery. When the fuel cell system is started in the low temperature state, however, the high-voltage secondary battery naturally has low temperature and accordingly has a low current supply capacity. This causes a problem that a high load is provided to the high-voltage secondary battery when the fuel cell system is started in the low temperature state.

SUMMARY

In order to solve at least part the problems described above, the disclosure may be implemented by aspects described below.

(1) According to one aspect of the disclosure, there is provided a fuel cell system. The fuel cell system comprises: a fuel cell; an FC auxiliary machine used to cause the fuel cell to generate electric power; a high-voltage secondary battery configured to supply electric power to the FC auxiliary machine; a low-voltage secondary battery configured to have a lower output voltage than a voltage of the high-voltage secondary battery; a DC-DC converter configured to step down the voltage of the high-voltage secondary battery and supply the stepped-down voltage to the low-voltage secondary battery; a loading device connected between the low-voltage secondary battery and the DC-DC converter; a temperature sensor configured to measure temperature of the high-voltage secondary battery; and a controller used to start the fuel cell system. The controller is configured to, (i) set an output voltage on a step-down side of the DC-DC converter to a higher voltage than the voltage of the low-voltage secondary battery and subsequently start the FC auxiliary machine using the electric power from the high-voltage secondary battery, when the temperature of the high-voltage, secondary battery obtained from the temperature sensor is higher than a predetermined reference value; and (ii) set the output voltage on the step-down side of the DC-DC converter to a lower voltage than the voltage of the low-voltage secondary battery and subsequently start the FC auxiliary machine using the electric power from the high-voltage secondary battery, when the temperature of the high-voltage secondary battery obtained from the temperature sensor is equal to or lower than the predetermined reference value.

The fuel cell system of this aspect performs normal operation when the temperature of the high-voltage secondary temperature is higher than the predetermined reference value. More specifically, the fuel cell system sets the output voltage on the step-down side of the DC-DC converter to the higher voltage than the voltage of the low-voltage secondary battery and allows the low-voltage secondary battery to be charged. In this state, since the temperature of the high-voltage secondary battery is higher than the predetermined reference value, this operation does not provide an excessive load to the high-voltage secondary battery. When the temperature of the high-voltage secondary battery is equal to or lower than the reference value, on the other hand, the fuel cell system sets the output voltage on the step-down side of the DC-DC converter to the lower voltage than the voltage of the low-voltage secondary battery. The fuel cell system is accordingly started in the state that the low-voltage secondary battery is not charged with the electric power supplied from the high-voltage secondary battery via the DC-DC converter. This configuration reduces the load of the high-voltage secondary battery at the starting time of the fuel cell system.

(2) The fuel cell system according to the above aspect; in the (i), the controller may be configured to set the output voltage on the step-down side of the DC-DC converter to a higher voltage than a maximum value in an allowable voltage range of the low-voltage secondary battery.

The fuel cell system of this aspect allows the low-voltage secondary battery to be charged without measuring the voltage or the electric current of the low-voltage secondary battery.

(3) The fuel cell system according to the above aspect; in the (ii), the controller may be configured to set the output voltage on the step-down side of the DC-DC converter to a lower voltage than a minimum value in the allowable voltage range of the low-voltage secondary battery.

The fuel cell system of this aspect does not allow the low-voltage secondary battery to be charged without measuring the voltage or the electric current of the low-voltage secondary battery.

(4) The fuel cell system according to the above aspect; further comprises a sensor configured to measure one of electric current and voltage of the low-voltage secondary battery, wherein in the (ii), the controller may be configured to control the output voltage on the step-down side of the DC-DC converter, such as not to charge the low-voltage secondary battery, based on the one of the electric current and the voltage of the low-voltage secondary battery obtained from the sensor.

The fuel cell system of this aspect increases the output voltage on the low voltage secondary battery-side of the DC-DC converter to such a level that does not allow the low-voltage secondary battery to be charged. This reduces the load of the high-voltage secondary battery.

(5) The fuel cell system according to the above aspect; further comprises an FC current sensor configured to measure electric current of the fuel cell, wherein after a start of the FC auxiliary machine, when it is determined that the fuel cell starts power generation based on a measurement value of the FC current sensor, in the (ii), the controller may be configured to set the output voltage on the step-down side of the DC-DC converter to a higher voltage than a maximum value in an allowable voltage range of the low-voltage secondary battery.

In the fuel cell system of this aspect, after the fuel cell starts power generation, the low-voltage secondary battery is allowed to be charged with the electric power supplied from the fuel cell. This configuration allows the low-voltage secondary battery to be charged without increasing the load of the high-voltage secondary battery.

(6) According to another aspect of the disclosure, there is provided a fuel cell system. The fuel cell system comprises: a fuel cell; an FC auxiliary machine used to cause the fuel cell to generate electric power; a high-voltage secondary battery configured to supply electric power to the FC auxiliary machine; a low-voltage secondary battery configured to have a lower output voltage than a voltage of the high-voltage secondary battery; a DC-DC converter configured to step down the voltage of the high-voltage secondary battery and supply the stepped-down voltage to the low-voltage secondary battery; a loading device connected between the low-voltage secondary battery and the DC-DC converter; a temperature sensor configured to measure temperature of the high-voltage secondary battery; and a controller used to start the fuel cell system. The controller is configured to (i) set an output voltage on a step-down side of the DC-DC converter to a higher voltage than the voltage of the low-voltage secondary battery and subsequently start the FC auxiliary machine using the electric power from the high-voltage secondary battery, when the temperature of the high-voltage secondary battery obtained from the temperature sensor is higher than a predetermined reference value; and (ii) keep operation of the DC-DC converter at stop or to separate the DC-DC converter from the low-voltage secondary battery by means of a relay and subsequently start the FC auxiliary machine using the electric power from the high-voltage secondary battery, when the temperature of the high-voltage secondary battery obtained from the temperature sensor is equal to or lower than the predetermined reference value.

The fuel cell system of this aspect performs normal operation when the temperature of the high-voltage secondary temperature is higher than the predetermined reference value. More specifically, the fuel cell system sets the output voltage on the step-down side of the DC-DC converter to the higher voltage than the voltage of the low-voltage secondary battery and allows the low-voltage secondary battery to be charged. In this state, since the temperature of the high-voltage secondary battery is higher than the predetermined reference value, this operation does not provide an excessive load to the high-voltage secondary battery. When the temperature of the high-voltage secondary battery is equal to or lower than the reference value, on the other hand, the fuel cell system keeps the operation of the DC-DC converter at stop or separates the DC-DC converter from the low-voltage secondary battery by means of the relay. The fuel cell system is accordingly started in the state that the low-voltage secondary battery is not charged with the electric power supplied from the high-voltage secondary battery via the DC-DC converter. This configuration reduces the load of the high-voltage secondary battery at the starting time of the fuel cell system.

(7) The fuel cell system according to the above aspect; in the (i), the controller may be configured to set the output voltage on the step-down side of the DC-DC converter to a higher voltage than a maximum value in an allowable voltage range of the low-voltage secondary battery.

The fuel cell system of this aspect allows the low-voltage secondary battery to be charged without measuring the voltage or the electric current of the low-voltage secondary battery.

(8) The fuel cell system according to the above aspect; further comprises an ambient temperature sensor configured to measure ambient temperature, wherein the controller is configured to stop the fuel cell system after charging the low-voltage secondary battery such that the voltage of the low-voltage secondary battery reaches a maximum value in an allowable voltage range of the low-voltage secondary battery, when the measured ambient temperature is lower than a predetermined temperature.

The fuel cell system of this aspect increases the voltage of the low-voltage secondary battery to a sufficiently high level at the stop of the fuel cell system. The low-voltage secondary battery accordingly has a sufficiently high voltage level when the fuel cell system is subsequently restarted. This configuration reduces the electric power charged into the low-voltage secondary battery even under operation of the DC-DC converter and thereby reduces the load of the high-voltage secondary battery.

The present disclosure may be implemented by any of various aspects other than the fuel cell system described above, for example, a control method of the fuel cell system, a vehicle equipped with the fuel cell system, or a moving body.

DESCRIPTION OF EMBODIMENTS

First Embodiment

Figure 1:
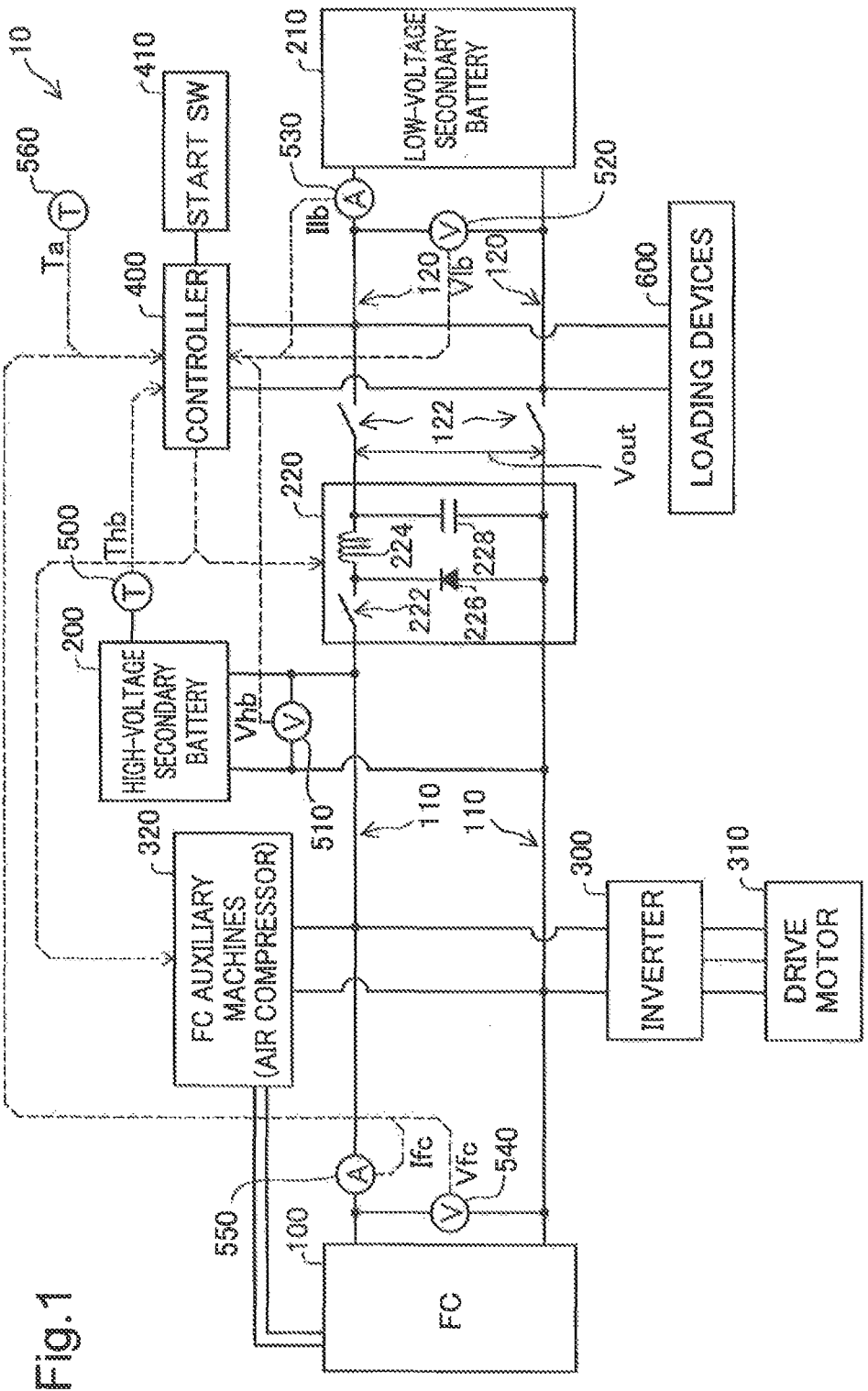
FIG. 1 is a diagram illustrating the schematic configuration of a fuel cell system.

FIG. 1 is a diagram illustrating the schematic configuration of a fuel cell system 10. This fuel cell system 10 is mounted on a moving body such as a vehicle. The fuel cell system 10 may include a fuel cell 100 (call "FC" for fuel cell), high-voltage wiring 110, low-voltage wiring 120, a high-voltage secondary battery 200, a low-voltage secondary battery 210, a DC-DC converter 220 (call "DDC" for DC-DC converter), an inverter 30, a drive motor 310, FC auxiliary machines 320, a controller 400, a start switch 410 and loading devices 600. The high-voltage wiring 110 is connected with the fuel cell 100, the high-voltage secondary battery 200, the DC-DC converter 220, the inverter 300 and the FC auxiliary machines 320. The low-voltage wiring 120 is connected with the DC-DC converter 220, the low-voltage secondary battery 210, the controller 400 and the loading devices 600. A relay 122 is provided in the low-voltage wiring 120 between the DC-DC converter 220 and the low-voltage secondary battery 210. The controller 400 and the loading devices 600 are arranged on the low-voltage secondary battery 210-side of the relay 122 in the low-voltage wiring 120. The relay 122 may be omitted as appropriate.

The fuel cell 100 is a power generation device configured to generate DC power by reaction of a fuel gas and an oxidizing gas. The fuel cell 100 is provided with an FC voltage sensor 540 configured to measure a voltage Vfc of the fuel cell 100 and with an FC current sensor 550 configured to measure an electric current Ifc of the fuel cell 100.

The high-voltage secondary battery 200 and the low-voltage secondary battery 210 are both secondary batteries but have different voltages. The high-voltage secondary battery 200 has a higher voltage Vhb than a voltage Vlb of the low-voltage secondary battery 210. The high-voltage secondary battery 200 may be configured by, for example, a nickel-metal hydride battery or a lithium ion battery. The voltage of the high-voltage secondary battery 200 is 200 V to 400 V, is preferably 240 V to 350 V and is more preferably 260 V to 300 V. The low-voltage secondary battery 210 may be configured by, for example, a lead acid battery. Typically the voltage of the low-voltage secondary battery 210 is approximately 12 V. The voltage of the low-voltage secondary battery 210 may, however, be in a range of 10 V to 30 V. The high-voltage secondary battery 200 is provided with a voltage sensor 510 configured to measure the voltage Vhb of the high-voltage secondary battery 200 and with a temperature sensor 500 configured to measure a temperature Thb of the high-voltage secondary battery 200. The low-voltage secondary battery 210 is provided with a voltage sensor 520 configured to measure the voltage Vlb of the low-voltage secondary battery 210 and with a current sensor 530 configured to measure an electric current Ilb of the low-voltage secondary battery 210.

The DC-DC converter 220 is a step-down converter configured to step down the voltage of the high-voltage secondary battery 200 or the fuel cell 100 and supply the power of stepped-down voltage to the low-voltage secondary battery 210-side. The DC-DC converter 220 is provided with a switch 222, a coil 224 (also called "reactor 224"), a diode 226, and a smoothing capacitor 228. According to a modification, the DC-DC converter 200 may be configured as a bidirectional DC-DC converter that also serves to step up the voltage of the low-voltage secondary battery 210 and supply the power of stepped-up voltage to the high-voltage secondary battery 200.

The inverter 300 serves to convert the DC power supplied from the fuel cell 100 or the high-voltage secondary battery 200 into, for example, three-phase AC power and supply the converted power to the drive motor 310. The drive motor 310 is a motor configured to drive wheels of the moving body (not shown). The FC auxiliary machines 320 are auxiliary devices configured to consume the power supplied from the fuel cell 100 or the high-voltage secondary battery 200 and cause the fuel cell 100 to generate electric power. The FC auxiliary machines 320 include, for example, an air compressor configured to supply the oxidizing gas to the fuel cell 100 and a pump configured to supply the fuel gas to the fuel cell 100. At the starting time of the fuel cell system 10, power generation of the fuel cell 100 has not yet been started, so that the FC auxiliary machines 320 operate with the electric power supplied from the high-voltage secondary battery 200. After a start of power generation of the fuel cell 100, the FC auxiliary machines 320 operate with the electric power supplied from the fuel cell 100. In the illustrated configuration of FIG. 1, the FC auxiliary machines 320 are directly connected with the high-voltage wiring 110. According to a modification, ail inverter may be provided between the FC auxiliary machines 320 and the high-voltage wiring 110 and may be configured to drive the FC auxiliary machines 320 with the AC power. According to another modification, part of the FC auxiliary machines may be connected with the low-voltage wiring 120. In this case, the FC auxiliary machines connected with the low voltage wiring 120 are included in the loading devices 600.

The controller 400 is connected with the low-voltage wiring 120, and the power required to operate the controller 400 is supplied from the low-voltage secondary battery 210. The controller 400 controls the FC auxiliary machines 320, the DC-DC converter 220 and the inverter 300 using an output request from the driver of the vehicle, the electric current Ifc and the voltage Vfc of the fuel cell 100, the temperature Thb and the voltage Vhb of the high-voltage secondary battery 200, the voltage Vlb and the electric current Ilb of the low-voltage secondary battery 210 and an ambient temperature Ta. The ambient temperature Ta is measured by an ambient temperature sensor 560. The controller 400 may be provided independently or may be incorporated as part of another control device, for example, as part of a control device of the moving body. The start switch 410 is a switch configured to start and stop the fuel cell system 10.

The loading devices 600 are various devices configured to receive the supply of power from the low-voltage secondary battery 210. The loading devices 600 include, for example, a drive unit configured to open and close valves in a fuel gas supply system of the fuel cell 100, a cooling pump configured to cool down the fuel cell 100, headlights and stoplights of the vehicle, and instruments of an instrument panel (not shown). The loading devices 600 connected with the low-voltage secondary battery 210 are, however, not limited to these examples.

Figure 2:
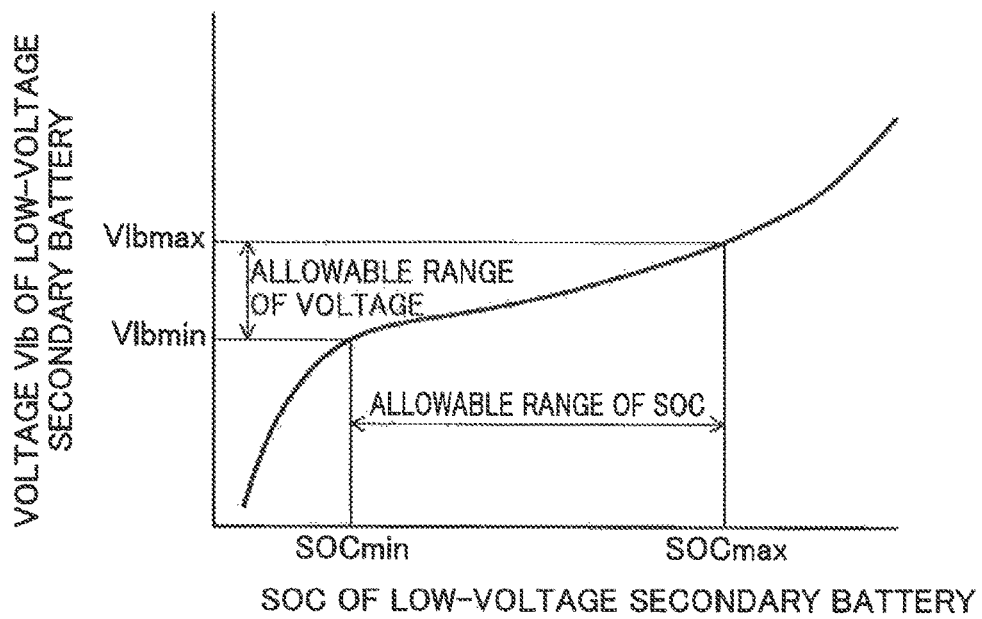
FIG. 2 is a graph showing a relationship of voltage to SOC of the low-voltage secondary battery.

FIG. 2 is a graph showing a relationship of voltage to SOC (state of charge) of the low-voltage secondary battery 210. In general, a secondary battery is controlled such as to regulate its SOC within a predetermined allowable range. The SOC is an index indicating the charge level of the secondary battery; 0% indicates no charge of the secondary battery and 100% indicates the full charge of the secondary battery. A minimum value SOCmin of the allowable range of SOC is generally set to a larger value than 0%, and a maximum value SOCmax is generally set to a smaller value than 100%. In general, the voltage increases with an increase in SOC and decreases with a decrease in SOC. The relationship of voltage Vlb to SOC of the low-voltage secondary battery 210 is experimentally or otherwise measured in advance. The SOC of the low-voltage secondary battery 210 out of the allowable range is likely to cause deterioration of the low-voltage secondary battery 210. The low-voltage secondary battery 210 is accordingly controlled such as to regulate the SOC within the allowable range. The same applies to the high-voltage secondary battery 200. Although not specifically illustrated in FIG. 1, the secondary batteries 200 and 210 are provided with SOC sensors according to a preferable configuration. In the graph of FIG. 2, the voltage at the maximum value SOCmax in the allowable range of SOC is a maximum allowable voltage Vlbmax during normal operation of the low-voltage secondary battery 210. The voltage at the minimum value SOCmin in the allowable range of SOC is a minimum allowable voltage Vlbmin during normal operation of the low-voltage secondary battery 210. Accordingly the controller 400 controls the voltage of the low-voltage secondary battery 210 to be not lower than the minimum allowable voltage Vlbmin and not higher than the maximum allowable voltage Vlbmax and thereby suppresses deterioration of the low-voltage secondary battery 210.

Figure 3:
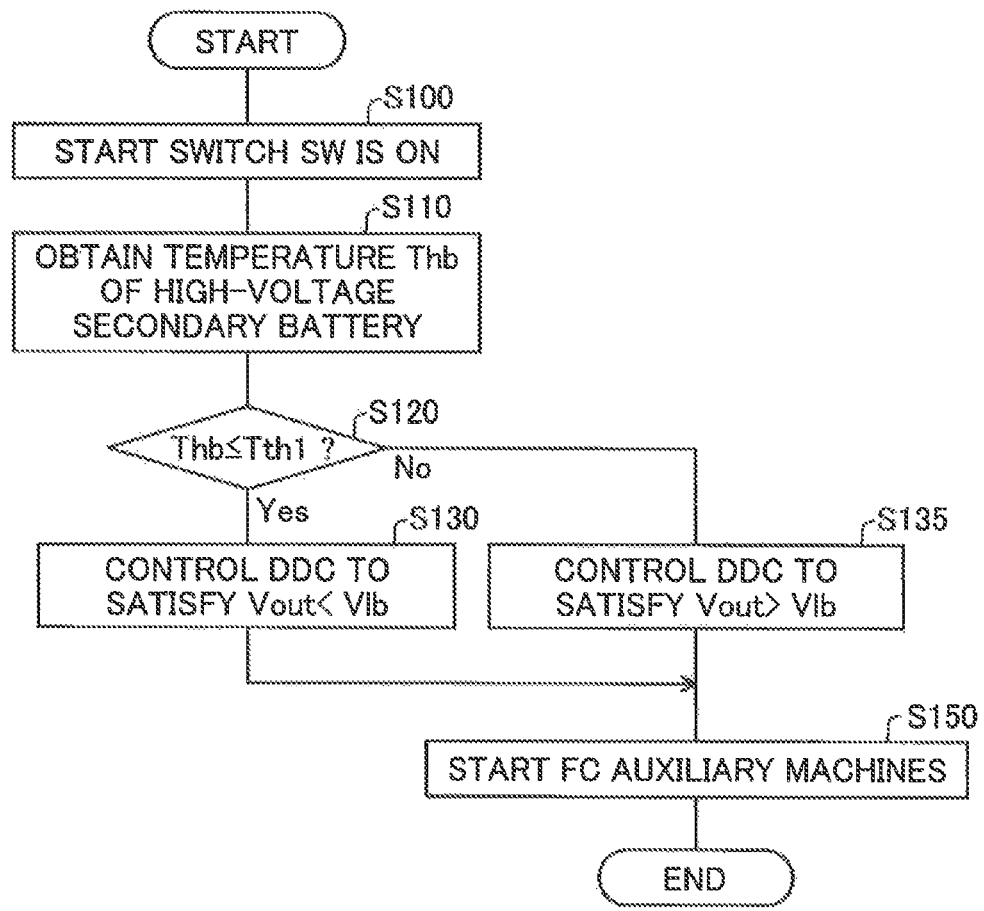
FIG. 3 is a control flowchart performed at the starting time according to the first embodiment.

FIG. 3 is a control flowchart performed at the starting time according to the first embodiment. The controller 400 detects a press-ON of the start switch 410 at step S100 and proceeds to step S110.

At step S110, the controller 400 obtains the temperature Thb of the high-voltage secondary battery 200 from the temperature sensor 500. At step S120, the controller 400 determines whether the temperature Thb of the high-voltage secondary battery 200 is equal to or lower than a predetermined reference value Tth1. When the temperature Thb of the high-voltage secondary battery 200 is equal to or lower than the reference value Tth1, the controller 400 proceeds to step S130. When the temperature Thb of the high-voltage secondary battery 200 is higher than the reference value Tth1, on the other hand, the controller 400 proceeds to step S135.

The current supply capacity of the high-voltage secondary battery 200 is determined by the temperature Thb and the SOC of the high-voltage secondary battery 200. At a fixed SOC, the current supply capacity decreases with a decrease in temperature Thb. When the temperature Thb of the high-voltage secondary battery 200 is low, it is accordingly preferable to keep the power supply from the high-voltage secondary battery 200 at a low level. The power required to operate the controller 400 and the loading devices 600 is supplied from the low-voltage secondary battery 210 or from the DC-DC converter 220, and the power is supplied from the high-voltage secondary battery 200 to the DC-DC converter 220. When the temperature Thb of the high-voltage secondary battery 200 is low, a preferable control procedure accordingly causes the power to be supplied from the low-voltage secondary battery 210 to the controller 400 and the loading devices 600 and does not allow the low-voltage secondary battery 210 to be charged with the output power from the DC-DC converter 220. Especially at a sub-zero temperature, the high-voltage secondary battery 200 has significantly low current supply capacity. It is accordingly preferable to set the reference value Tth1 at step S120, for example, in a range of 0±2° C.

At step S130, the controller 400 sets an output voltage Vout on the low voltage secondary battery 210-side (step-down side) of the DC-DC converter 220 to a value lower than the voltage Vlb of the low-voltage secondary battery 210. This does not allow the low-voltage secondary battery 210 to be charged with the output power from the DC-DC converter 220 and thereby reduces the load of the high-voltage secondary battery 200. In this state, the power required to operate the controller 400 and the loading devices 600 is supplied from the low-voltage secondary battery 210. Any of various methods described below may be employed as the concrete procedure of step S130.

<Method 130-1>

The controller 400 sets the output voltage Vout on the step-down side of the DC-DC converter 220 to be lower than the voltage Vlb of the low voltage secondary battery 210 measured by the voltage sensor 520.

<Method 130-2>

The controller 400 sets the output voltage Vout on the step-down side of the DC-DC converter 220 to a voltage lower than the minimum allowable voltage Vlbmin (shown in FIG. 2) that is the minimum value in the allowable voltage range of the low-voltage secondary battery 210. In the ordinary state, the voltage Vlb of the low-voltage secondary battery 210 is maintained to be equal to or higher than the minimum allowable voltage Vlbmin. Setting Vout<Vlbmin accordingly does not allow the low-voltage secondary battery 210 to be charged with the output power from the DC-DC converter 220. The minimum allowable voltage Vlbmin of the low-voltage secondary battery 210 is a known value. This method 130-2 accordingly performs the control of step S130 without measuring the present voltage Vlb o the low-voltage secondary battery 210. The method 130-2 is favorable than the above method 130-1 from this point of view.

<Method 130-3>

The electric current Ilb of the low voltage secondary battery 210 is measured and fed back, and the output voltage Vout on the step-down side of the DC-DC converter 220 is controlled to interfere with generation of charge current into the low-voltage secondary battery 210.

As described above, at step S130, the output voltage Vout on the step-down side of the DC-DC converter 220 is controlled to be lower than the voltage Vlb of the low-voltage secondary battery 210. This does not allow the low-voltage secondary battery 210 to be charged with the electric power supplied from the high-voltage secondary battery 200 via the DC-DC converter 220. As a result, this reduces the load of the high-voltage secondary battery 200 at the starting time of the fuel cell system 10. This also enables the voltage on the step-down side of the DC-DC converter 220 to be set based on the temperature Thb of the high-voltage secondary battery 200, prior to operation of the high-voltage secondary battery 200.

At step S135, the controller 400 sets the output voltage Vout on the step-down side of the DC-DC converter 220 to a value higher than the voltage Vlb of the low-voltage secondary battery 210. This allows the low-voltage secondary battery 210 to be charged. Any of various methods described below may be employed as the concrete procedure of step S135.

<Method 135-1>

The controller 400 sets the output voltage Vout on the step-down side of the DC-DC converter 220 to be higher than the voltage Vlb of the low-voltage secondary battery 210 measured by the voltage sensor 520.

<Method 135-2>

The controller 400 sets the output voltage Vout on the step-down side of the DC-DC converter 220 to a voltage that is equal to or higher than the maximum allowable voltage Vlbmax (shown in FIG. 2) that is the maximum value in the allowable range of the voltage Vlb of the low-voltage secondary battery 210. This method 135-2 definitely causes the low-voltage secondary battery 210 to be charged. The "voltage that is equal to or higher than the maximum allowable voltage Vlbmax of the low-voltage secondary battery 210" may be, for example, a voltage at the full charge level of the low-voltage secondary battery 210 (voltage at the SOC of 100%).

<Method 135-3>

The electric current Ilb of the low-voltage secondary battery 210 is measured and fed back, and the output voltage Vout on the step-down side of the DC-DC converter 220 is controlled to generate the charge current into the low-voltage secondary battery 210.

The operation performed when the control flow proceeds to step S135 is normal operation performed when the temperature Thb of the high-voltage secondary battery 200 is higher than the reference value Tth1. Even when the low-voltage secondary battery 210 is charged with the electric power supplied from the high-voltage secondary battery 200 via the DC-DC converter 220, this does not provide an excessive load to the high-voltage secondary battery 200. Accordingly it is preferable to charge the low-voltage secondary battery 210 at the starting time of the fuel cell system 10, such that the low-voltage secondary battery 200 has a sufficient state of charge.

After performing the control of either step S130 or step S135, the controller 400 proceeds to step S130. At step S150, the controller 400 starts the FC auxiliary machines 320 using the electric power supplied from the high-voltage secondary battery 200 to supply the oxidizing gas and the fuel gas to the fuel cell 100. The fuel cell 100 generates electric power by the chemical reaction. There is accordingly a slight time lag between the time when the supplies of the oxidizing gas and the fuel gas is started and the time when the fuel cell 100 starts power generation and is able to supply electric current. The power required to operate the FC auxiliary machines 320 during this time duration is supplied from the high-voltage secondary battery 200. After the fuel cell 100 reaches the power generation-allowable state, the control procedure appropriately shifts to the normal control subsequent to the start. For example, after the fuel cell 100 reaches the power generation-allowable state, the controller 400 may shift to the normal control and appropriately control the operating state of the DC-DC converter 220 according to the subsequent operation condition of the fuel cell system 10. In another example, after elapse of a predetermined time period since the start of step S150, the controller 400 may shift to the normal control and appropriately control the operating state of the DC-DC converter 220 according to the subsequent operation condition of the fuel cell system 10.

As described above, according to the first embodiment, when the temperature Thb of the high-voltage secondary battery 200 is equal to or lower than the reference value Tth1, the controller 400 sets the output voltage Vout on the step-down side of the DC-DC converter 220 to be lower than the voltage Vlb of the low-voltage secondary battery 210. This does not allow the low-voltage secondary battery 210 to be charged with the output power from the high-voltage secondary battery 200. This accordingly reduces the load of the high-voltage secondary battery 200 at the starting time of the fuel cell system 10. When the temperature Thb of the high-voltage secondary battery 200 is higher than the reference value Tth1, on the other hand, the controller 400 sets the output voltage Vout on the step-down side of the DC-DC converter 220 to be higher than the voltage Vlb of the low-voltage secondary battery 210. This allows the low-voltage secondary battery 210 to be charged. In this case, since the temperature Thb of the high-voltage secondary battery 200 is higher than the reference value Tth1, this does not provide an excessive load to the high-voltage secondary battery 200. The problem that an excessive load is provided to the high-voltage secondary battery 200 in the low temperature state at the starting time is especially remarkable when the high-voltage secondary battery 200 is a lithium ion battery. The control flow of FIG. 3 employed for the lithium ion battery thus provides the especially significant advantageous effect.

Second Embodiment

Figure 4:
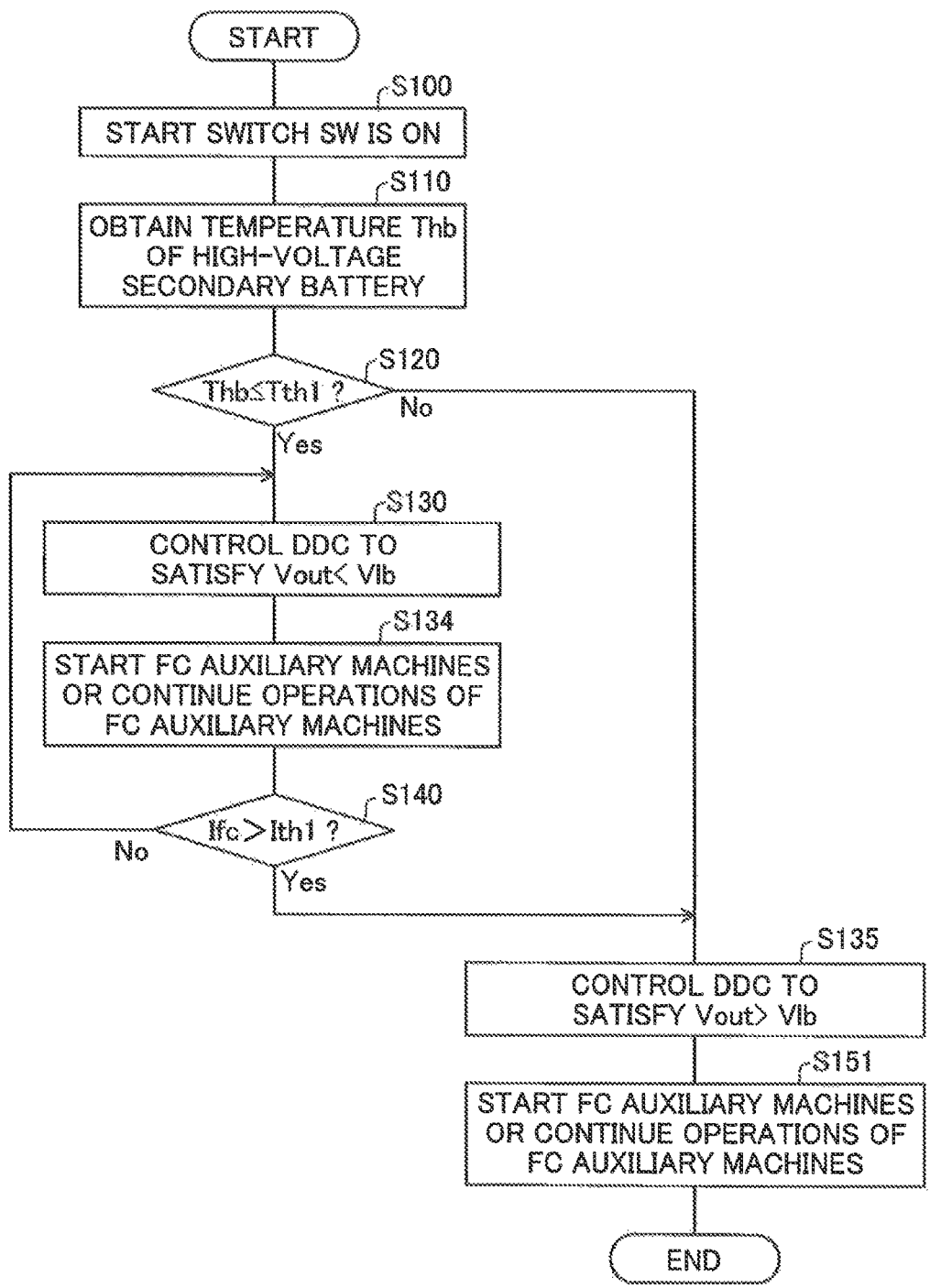
FIG. 4 is a control flowchart at the starting time according to a second embodiment.

FIG. 4 is a control flowchart at the starting time according to a second embodiment. The control flowchart of the second embodiment differs from the control flowchart of the first embodiment shown in FIG. 3 by addition of step S134 and step S140 after step S130 and addition of step S151 after step S135. Like step S150 (shown in FIG. 3), at step S134, the controller 400 starts the FC auxiliary machines 320 using the power supplied from the high-voltage secondary battery 200 to supply the oxidizing gas and the fuel gas to the fuel cell 100. The fuel cell 100 accordingly starts or continues power generation. In a second or subsequent cycle of step S134 subsequent to a first cycle of step S134, the FC auxiliary machines 320 continue the operations. At step S140, the controller 400 determines whether the electric current Ifc output from the fuel cell 100 is higher than a predetermined reference value Ith1. When the electric current Ifc output from the fuel cell 100 is higher than the reference value Ith1, the controller 400 determines that the fuel cell 100 starts power generation and is able to supply a sufficient power (electric current) and proceeds to step S135. When the electric current Ifc is equal to or lower than the reference value Ith1, i.e., before it is determined that the fuel cell 100 starts power generation and is able to supply a sufficient power (electric current), the controller 400 returns to step S130. The processing of steps S130 to S140 is repeated until it is determined at step S140 that the electric current Ifc output from the fuel cell 100 becomes higher than the reference value Ith1. The reference value Ith1 is a criterion value used to determine whether the fuel cell 100 is able to generate a sufficient power, and is determined experimentally or empirically. Like step S150, at step S151, the controller 400 starts the FC auxiliary machines 320 using the power supplied from the high-voltage secondary battery 200 to supply the oxidizing gas and the fuel gas to the fuel cell 100. When the controller 400 shifts from step S140 to step S135, the PC auxiliary machines 320 have already been started at step S134, so that the PC auxiliary machines 320 continue the operations at step S151. The processing subsequent to step S151 is substantially similar to the processing subsequent to step S150 of the first embodiment and is thus not specifically described.

Figure 5:
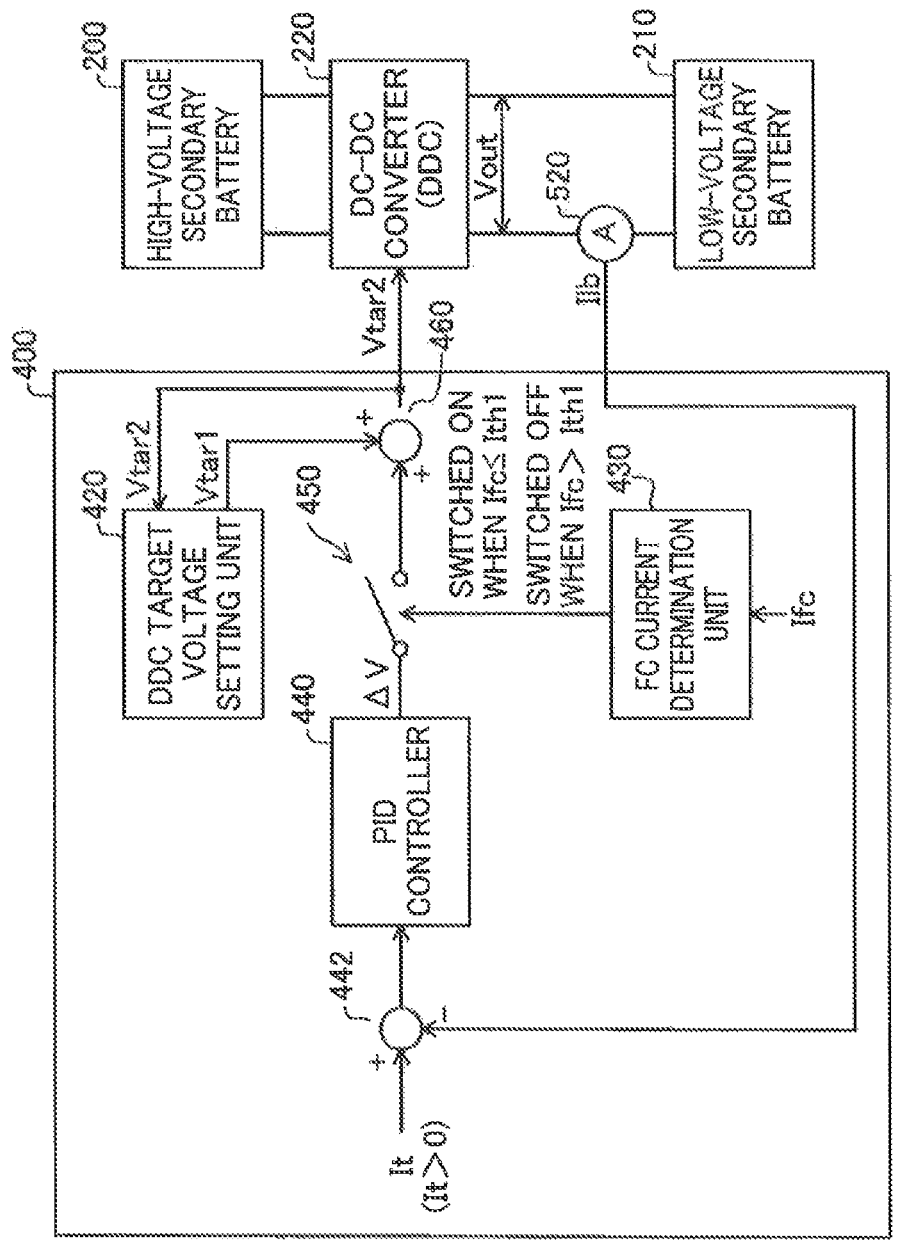
FIG. 5 is a control block diagram illustrating exemplary centre blocks configured to perform the processing according to the second embodiment.

FIG. 5 is a control block diagram illustrating exemplary control blocks configured to perform the processing of steps S130 and S140 according to the second embodiment. These control blocks correspond to the method 130-3 described in the first embodiment. The controller 400 may include a DDC target voltage setting unit 420, an FC current determination unit 430, a PID controller 440, a subtractor 442, a switch 450 and an adder 460. The DDC target voltage setting unit 420 is configured to set a voltage command value Vtar1 on the low-voltage secondary battery 210-side of the DC-DC converter 220. The DDC target voltage setting unit 420 may set, for example, a value that is equal to or higher than the maximum allowable voltage Vlbmax of the low-voltage secondary battery 210, as the voltage command value Vtar1. The voltage command value Vtar1 is set to be equal to or higher than the maximum allowable voltage Vlbmax, in order to allow the low-voltage secondary battery 210 to be charged with electric power in a disconnected state of the switch 450. The subtractor 442 is configured to calculate a difference (=It−Ilb) between a target current It and the electric current Ilb (measured value) and send the calculated difference to the PID controller 440. The electric current Ilb of the low voltage secondary battery 210 has a positive value in the discharge state. The target current It is set to a positive value. The DC-DC converter 220 is accordingly controlled such as to provide the electric current Ilb of the low-voltage secondary battery 210 that is higher than zero (i.e., to provide discharge current).

The FC current determination unit 130 is configured to output an instruction to connect or disconnect the switch 450 using the electric current Ifc of the fuel cell 100. When the electric current Ifc is equal to or lower than a reference value Ith1, the switch 450 is connected (switched ON). When the electric current Ifc is higher than the reference value Ith1, on the other hand, the switch 450 is disconnected (switched OFF). The reference value Ith1 is equal to the reference value Ith1 used at step S140 of FIG. 4. The PID controller 440 is configured to perform a PID control operation based on the sum of the measured electric current Ilb and the target current It and output a difference value ΔV of the voltage command value. The PID controller 440 may be replaced with a PI controller. The adder 460 is configured to calculate a voltage command value Vtar2 by adding the difference value ΔV to the voltage command value Vtar1 and send the voltage command value Vtart2 to the DC-DC converter 220. The DC-DC converter 220 is then operated to make the output voltage Vout on the step-down side equal to the voltage command value Vtar2.

Such PID control eventually causes the output voltage Vout of the DC-DC converter 220 to be lower than the voltage Vlb of the low-voltage secondary battery 210 and not to be charged into the low-voltage secondary battery 210. This does not allow the low-voltage secondary battery 210 to be charged with the electric power supplied from the high-voltage secondary battery 200 via the DC-DC converter 220 and thereby reduces the load of the high-voltage secondary battery 200. After the fuel cell 100 starts power generation, the switch 450 is disconnected. The voltage command value Vtar2 for the output voltage of the DC-DC converter 220 accordingly becomes equal to the original voltage command value Vtar1 (≥Vlbmax). This allows the low-voltage secondary battery 210 to be charged with the electric power supplied via the DC-DC converter 220. The electric power is, however, also supplied from the fuel cell 100. This accordingly does not provide an excessive load to the high-voltage secondary battery 200.

The DC-DC converter 220 generally increases the power consumption with an increase in the step-down width. The power that is to be consumed by the DC-DC converter 220 is supplied from the high-voltage secondary battery 200. It is accordingly preferable that the step-down width on the low-voltage secondary battery 210-side of the DC-DC converter 220 is not set to an excessively large value. The configuration of FIG. 5 decreases the power consumption by the DC-DC converter 220, while controlling the charge into the low-voltage secondary battery 210. This accordingly reduces the load of the high-voltage secondary battery 200.

As described above, according to the second embodiment, when the temperature Thb of the high-voltage secondary battery 200 is equal to or lower than the reference value Tth1, the controller 400 controls the output voltage Vout on the low-voltage secondary battery 210-side of the DC-DC converter 220 to be lower than the voltage Vlb of the low-voltage secondary battery 210 until the fuel cell 100 starts power generation. This decreases the power consumption by the DC-DC converter 220, while controlling the charge into the low-voltage secondary battery 210. This accordingly reduces the load of the high-voltage secondary battery 200. After the fuel cell 100 starts power generation, the fuel cell 100 is able to supply a sufficient power (electric current) to the DC-DC converter 220. Charging the low-voltage secondary battery 210 accordingly does not provide an excessive load to the high-voltage secondary battery 200.

Third Embodiment

Figure 6:
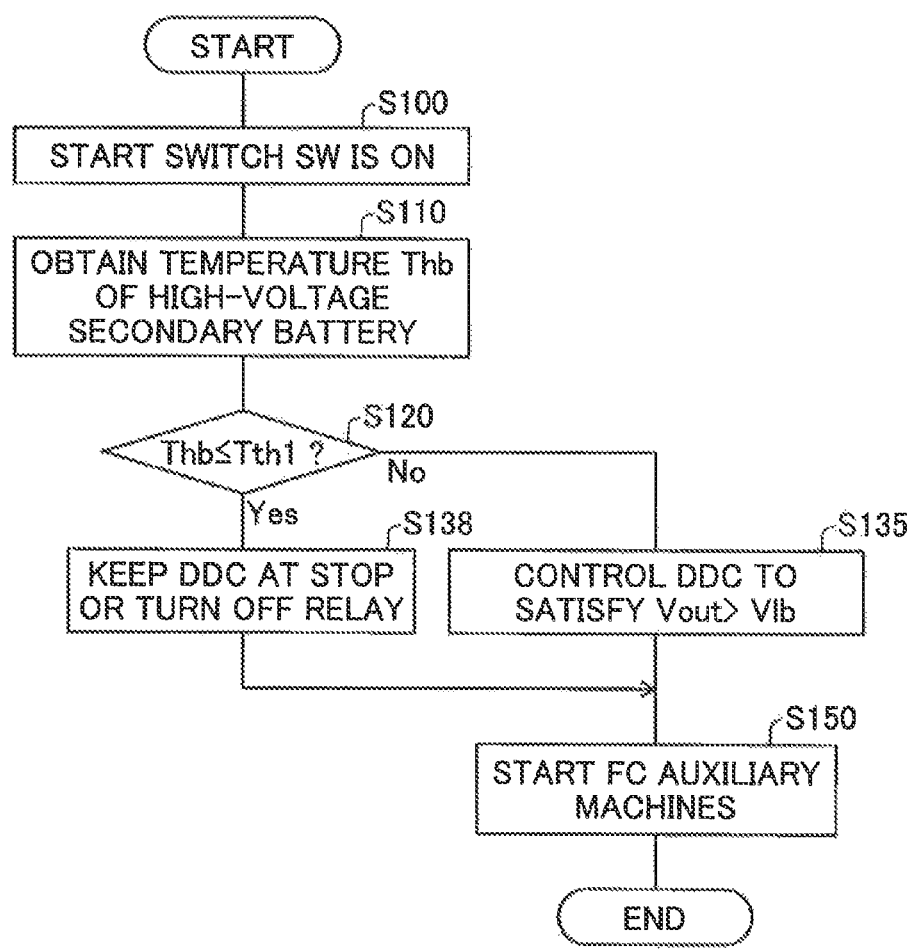
FIG. 6 is a control flowchart at the starting time according to a third embodiment.

FIG. 6 is a control flowchart at the starting time according to a third embodiment. The control flowchart of the third embodiment differs from the control flowchart of the first embodiment shown in FIG. 3 by addition of step S138 in place of step S130. At step S138, the controller 400 opens the switch 222 of the DC-DC converter 220 and keeps the operation of the DC-DC converter 220 at stop. As a result, no electric current is flowed from the DC-DC converter 220 to the low-voltage secondary battery 210 or to the controller 400. This reduces the load of the high-voltage secondary battery 200. The controller 400 may open the relay 122 to separate the DC-DC converter 220 from the low-voltage secondary battery 210, instead of opening the switch 222 of the DC-DC converter 220. According to a modification, step S140 of the second embodiment (shown in FIG. 4) may be added after step S138, and the control flow may shift to step S135 on satisfaction of the condition of step S140. This modified configuration keeps the operation of the DC-DC converter 220 at stop until the fuel cell 100 is able to supply sufficient electric current to the DC-DC converter 220. This accordingly reduces the load of the high-voltage secondary battery 200.

Fourth Embodiment

Figure 7:
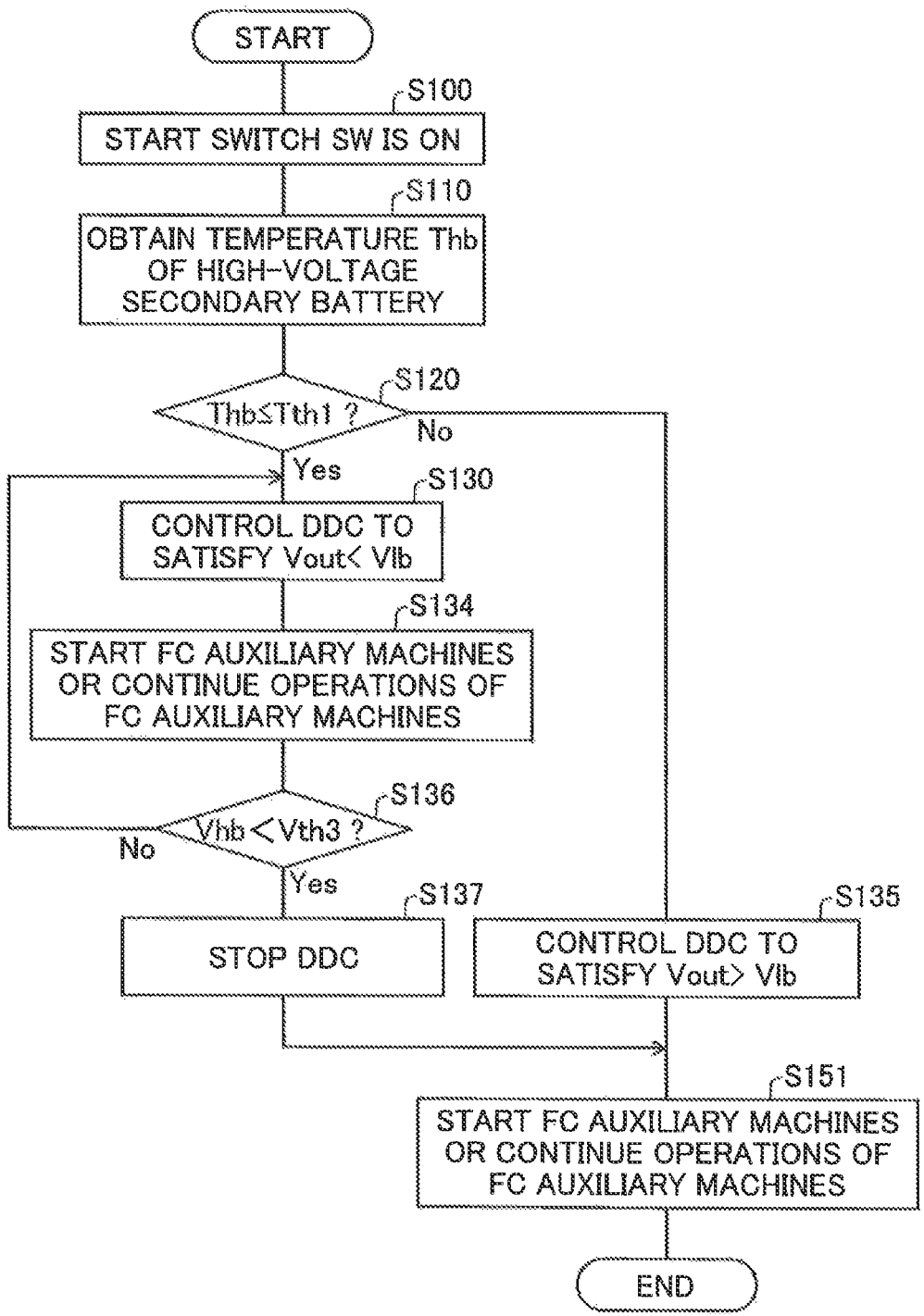
FIG. 7 is a control flowchart at the starting time according to a fourth embodiment.

FIG. 7 is a control flowchart at the starting time according to a fourth embodiment. The control flowchart of the fourth embodiment differs from the control flowchart of the first embodiment shown in FIG. 3 by addition of steps S134, S136 and S137 after step S130. Like step S134 of the second embodiment, at step S134, the controller 400 starts the FC auxiliary machines 320 or continues the operations of the FC auxiliary machines 320. At step S136, the controller 400 determines whether the voltage Vhb of the high-voltage secondary battery 200 becomes lower than a predetermined reference value Vth3. The voltage Vhb of the high-voltage secondary battery 200 is decreased by the following reasons:

(a) When the FC auxiliary machines 320 start operations at step S134, the power of the high-voltage secondary battery 200 is consumed by the FC auxiliary machines 320; and (b) When the DC-DC converter 220 is operated, the power of the high-voltage secondary battery 200 is consumed by the DC-DC converter 220.

When the voltage Vhb becomes lower than the reference value Vth3, the controller 400 proceeds to step S137 to stop the DC-DC converter 200 and thereby reduce the power consumption by the high-voltage secondary battery 200. The DC-DC converter 220 is stopped because of the following reason. The FC auxiliary machines 320 are required for power generation of the fuel cell 100 and are accordingly not allowed to be stopped. Stopping the DC-DC converter 220, on the other hand, does not provide any significant problem in continuing power generation of the fuel cell 100. The reference value Vth3 may be set to, for example, a voltage of the high-voltage secondary battery 200 corresponding to the amount of electric power (i.e., SOC) that enables the FC auxiliary machines 320 to be operated at the starting time of the fuel cell 100 until the fuel cell 100 starts power generation.

Like the first embodiment, according to the fourth embodiment, when the temperature Thb of the high-voltage secondary battery 200 is equal to or lower than the reference value Tth1, the controller 400 sets the voltage on the low-voltage secondary battery 210-side of the DC-DC converter 220 to be lower than the voltage Vlb of the low-voltage secondary battery 210. When the electric power of the high-voltage secondary battery 200 is consumed and is decreased as a result of this control, the controller 400 stops the DC-DC converter 220. This reduces the power consumption by the DC-DC converter 220 and thereby reduces the load of the high-voltage secondary battery 200. According to a modification of the fourth embodiment, step S140 described above with reference to FIG. 4 may be added at least one of between step S134 and step S136 and after step S137, and the control flow may shift to step S135 on satisfaction of the condition of step S140. The control flow shifts to step S135 to allow the low-voltage secondary battery 210 to be charged after the fuel cell 100 starts power generation and is able to supply sufficient, electric current to the DC-DC converter 220.

Fifth Embodiment

Figure 8:
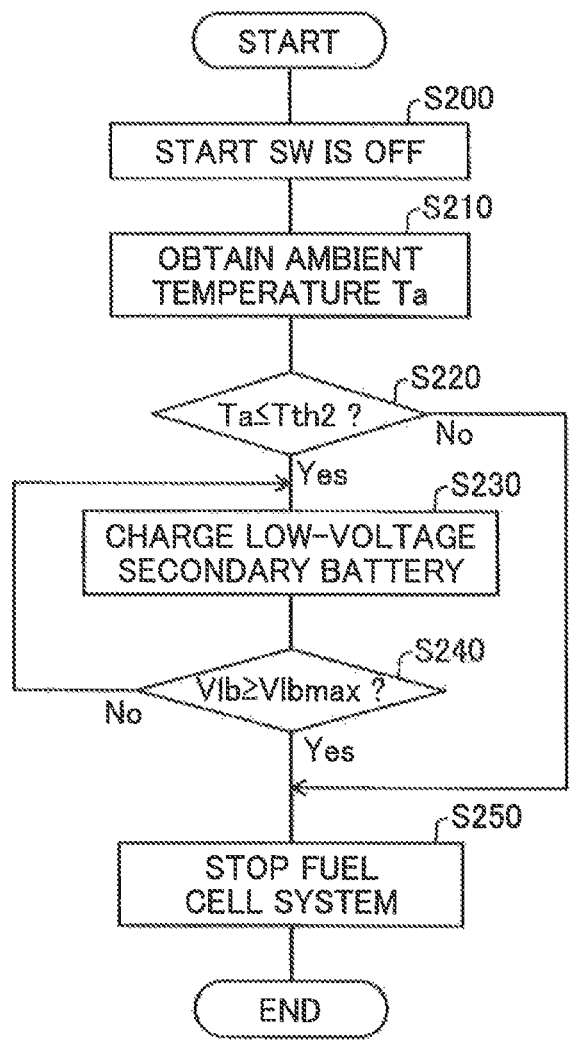
FIG. 8 is a control flowchart at the stop time according to a fifth embodiment.

FIG. 8 is a control flowchart at the stop time according to a fifth embodiment. The control flows of the first to the fourth embodiments are the control flows at the starting time of the fuel cell system 10, but the control flow of the fifth embodiment is the control flow at the stop time of the fuel cell system 10. In the first to the fourth embodiments, when the low-voltage secondary battery 210 has a sufficiently high voltage at the starting time of the fuel cell system 10, there is no need to operate the DC-DC converter 220 to charge the low-voltage secondary battery 210. In this case, even charging the low-voltage secondary battery 210 provides only a low load to the high-voltage secondary battery 200. According to the fifth embodiment, the low-voltage secondary battery 210 is charged to a sufficiently high voltage level at the stop of the fuel cell system 10. This configuration reduces the load of the high-voltage secondary battery 200 when the DC-DC converter 220 is operated to charge the low-voltage secondary battery 210.

In response to detection of an OFF operation of the start switch 410 during operation of the fuel cell system 10 at step S200, the controller 400 proceeds to step S210 to obtain the ambient temperature Ta from the ambient temperature sensor 560. At step S220, the controller 400 determines whether the ambient temperature Ta is equal to or lower than a predetermined reference value Tth2. When the ambient temperature Ta is equal to or lower than the reference value Tth2, the controller 400 proceeds to step S230. When the ambient temperature Ta is higher than the reference value Tth2, on the other hand, the controller 400 proceeds to step S250. The reference value Tth2 may be identical with the reference value Tth1 used at step S120 of the first embodiment or may be different from the reference value Tth1. According to a modification, the controller 400 may estimate an ambient temperature at the time of a next ON operation of the start switch 410, based on a record of the ambient temperature Ta (for example, the time and the ambient temperature at the time of each OFF operation of the start switch 410 and the time and the ambient temperature at the time of each ON operation of the start switch 410) for a predetermined time period (for example, 24 hours or one week) prior to a present OFF operation of the start switch 410, in addition to the ambient temperature Ta at the time of the OFF operation of the start switch 410 and may perform the determination of step S220 based on the estimated ambient temperature. Such modification is attributed to the possibility that the ambient temperature Ta decreases at the time of a next ON operation of the start switch 410 and the temperature Thb of the high-voltage secondary battery 200 also decreases.

At step S230, the controller 400 sets, for example, the output voltage Vout on the step-down side of the DC-DC converter 220 to be equal to or higher than the maximum allowable voltage Vlbmax and charges the low-voltage secondary battery 210. When the voltage Vlb of the low-voltage secondary battery 210 becomes equal to or higher than the maximum allowable voltage Vlbmax at step S240, the controller 400 proceeds to step S250. At step S250, the controller 400 stops the supplies of the oxidizing gas and the fuel gas to the fuel cell 100 to stop power generation of the fuel cell 100 and then stop the fuel cell system 10.

According to the fifth embodiment, the low-voltage secondary battery 210 is charged at the stop time of the fuel cell system 10. The sufficient voltage is thus likely to remain in the low-voltage secondary battery 210 even in the case of self-discharge of the low-voltage secondary battery 210 before a restart of the fuel cell system 10. This configuration accordingly reduces the load of the high-voltage secondary battery 200 at the time of restarting the fuel cell system 10.

[Modification]

Figure 9:
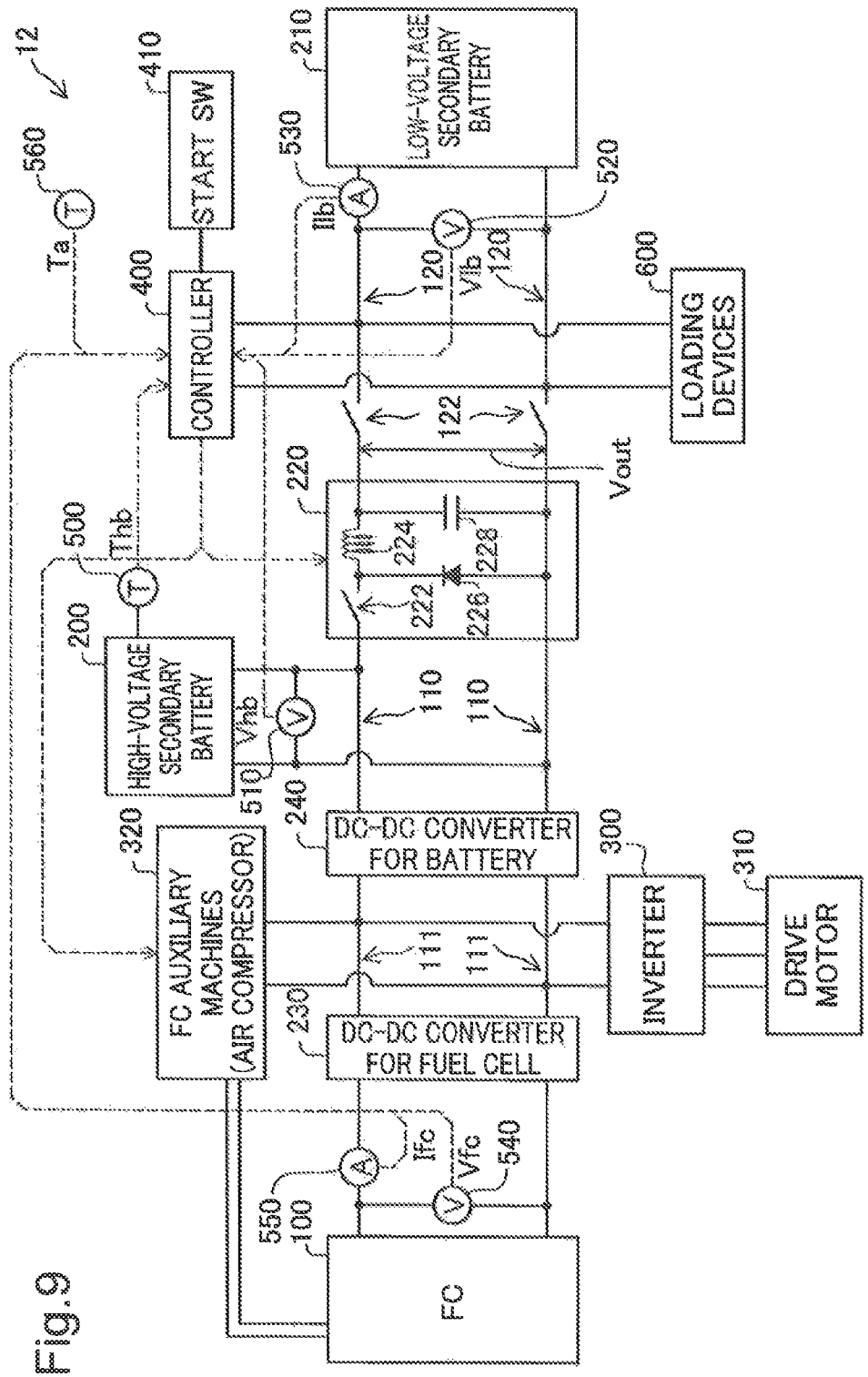
FIG. 9 is a diagram illustrating the schematic configuration of a fuel cell system according to a modification.

FIG. 9 is a diagram illustrating the schematic configuration of a fuel cell system 12 according to a modification. In the fuel cell system 10 shown in FIG. 1, the fuel cell 100 and the high-voltage secondary battery 200 are directly connected with each other via the high-voltage wiring 110. The fuel cell system 12 shown in FIG. 9, however, includes a DC-DC converter for fuel cell 230 and a DC-DC converter for battery 240 between the fuel cell 100 and the high-voltage secondary battery 200. In this modification, high-voltage wiring is accordingly divided into first high-voltage wiring 110 of the relatively lower voltage and second high-voltage wiring 111 of the relatively higher voltage. In the fuel cell system 12, the inverter 300 and the FC auxiliary machines 320 are connected with the second high-voltage wiring 111 between the DC-DC converter for fuel cell 230 and the DC-DC converter for battery 240. The DC-DC converter for fuel cell 230 steps up the voltage of the fuel cell 100 and outputs the stepped-up voltage to the second high-voltage wiring 111. The DC-DC converter for battery 240 is a bidirectional DC-DC converter configured to perform voltage conversion between the first high-voltage wiring 110 and the second high-voltage wiring 111. For example, the first high-voltage wiring 110 may be used at the voltage of 200 V to 400V, preferably at the voltage of 240 V to 350 V or more preferably at the voltage of 260 V to 300 V. The second high-voltage wiring 111 may be used at the voltage of 500 V to 700 V or more preferably at the voltage of 600 V to 650 V. The low-voltage wiring 120 may be used at the voltage of lower than 100 V (generally lower than 30 V). The two high-voltage wirings 110 and 111 have the higher voltages than the voltage of the low-voltage wiring 120. The two high-voltage wirings 110 and 111 may thus be simply called "high-voltage wiring" without discrimination from each other. Any of the control flows described in FIG. 3, FIG. 4 and FIGS. 6 to 8 may be employed as the control flow of the fuel cell system 12. A modified configuration may include only one of the DC-DC converter for fuel cell 230 and the DC-DC converter for battery 240.

The foregoing describes some aspects of the disclosure with reference to some embodiments. The embodiments of the disclosure described above are provided only for the purpose of facilitating the understanding of the disclosure and not for the purpose of limiting the disclosure in any sense. The disclosure may be changed, modified and altered without departing from the scope of the disclosure and includes equivalents thereof.

What is claimed is:

1. A fuel cell system, comprising:
a fuel cell;
an FC auxiliary machine used to supply fuel or gas to the fuel cell to cause the fuel cell to generate electric power;
a high-voltage secondary battery configured to supply electric power to the FC auxiliary machine;
a low-voltage secondary battery configured to have a lower output voltage than a voltage of the high-voltage secondary battery;
a DC-DC converter configured to step down the voltage of the high-voltage secondary battery and supply the stepped-down voltage to the low-voltage secondary battery;
a loading device connected between the low-voltage secondary battery and the DC-DC converter;
a temperature sensor configured to measure temperature of the high-voltage secondary battery; and
a controller used to start the fuel cell system, wherein the controller is configured to perform
(i) a first operation to set an output voltage on a step-down side of the DC-DC converter to a higher voltage than the voltage of the low-voltage secondary battery and subsequently start the FC auxiliary machine using the electric power from the high-voltage secondary battery, when the temperature of the high-voltage secondary battery obtained from the temperature sensor is higher than a predetermined reference value; and
(ii) a second operation to set the output voltage on the step-down side of the DC-DC converter to a lower voltage than the voltage of the low-voltage secondary battery and subsequently start the FC auxiliary machine using the electric power from the high-voltage secondary battery, when the temperature of the high-voltage secondary battery obtained from the temperature sensor is equal to or lower than the predetermined reference value.

2. The fuel cell system according to claim 1, wherein in the first operation, the controller is configured to set the output voltage on the step-down side of the DC-DC converter to a higher voltage than a maximum value in an allowable voltage range of the low-voltage secondary battery.

3. The fuel cell system according to claim 2, wherein in the second operation, the controller is configured to set the output voltage on the step-down side of the DC-DC converter to a lower voltage than a minimum value in the allowable voltage range of the low-voltage secondary battery.

4. The fuel cell system according to claim 3, further comprising:
an FC current sensor configured to measure electric current of the fuel cell, wherein
after a start of the FC auxiliary machine, when it is determined that the fuel cell starts power generation based on a measurement value of the FC current sensor, in the second operation, the controller is configured to set the output voltage on the step-down side of the DC-DC converter to a higher voltage than a maximum value in an allowable voltage range of the low-voltage secondary battery.

5. The fuel cell system according to claim 4, further comprising:
an ambient temperature sensor configured to measure ambient temperature, wherein the controller is configured to stop the fuel cell system after charging the low-voltage secondary battery such that the voltage of the low-voltage secondary battery reaches a maximum value in an allowable voltage range of the low-voltage secondary battery, when the measured ambient temperature is lower than a predetermined temperature.

6. The fuel cell system according to claim 3, further comprising:
an ambient temperature sensor configured to measure ambient temperature, wherein the controller is configured to stop the fuel cell system after charging the low-voltage secondary battery such that the voltage of the low-voltage secondary battery reaches a maximum value in an allowable voltage range of the low-voltage secondary battery, when the measured ambient temperature is lower than a predetermined temperature.

7. The fuel cell system according to claim 2, further comprising:
an FC current sensor configured to measure electric current of the fuel cell, wherein
after a start of the FC auxiliary machine, when it is determined that the fuel cell starts power generation based on a measurement value of the FC current sensor, in the second operation, the controller is configured to set the output voltage on the step-down side of the DC-DC converter to a higher voltage than a maximum value in an allowable voltage range of the low-voltage secondary battery.

8. The fuel cell system according to claim to 7, further comprising:
an ambient temperature sensor configured to measure ambient temperature, wherein the controller is configured to stop the fuel cell system after charging the low-voltage secondary battery such that the voltage of the low-voltage secondary battery reaches a maximum value in an allowable voltage range of the low-voltage secondary battery, when the measured ambient temperature is lower than a predetermined temperature.

9. The fuel cell system according to claim to 2, further comprising:
an ambient temperature sensor configured to measure ambient temperature, wherein the controller is configured to stop the fuel cell system after charging the low-voltage secondary battery such that the voltage of the low-voltage secondary battery reaches a maximum value in an allowable voltage range of the low-voltage secondary battery, when the measured ambient temperature is lower than a predetermined temperature.

10. The fuel cell system according to claim 1, further comprising:
a sensor configured to measure one of electric current and voltage of the low-voltage secondary battery, wherein in the second operation, the controller is configured to control the output voltage on the step-down side of the DC-DC converter, such as not to charge the low-voltage secondary battery, based on the one of the electric current and the voltage of the low-voltage secondary battery obtained from the sensor.

11. The fuel cell system according to claim 10, further comprising:
an FC current sensor configured to measure electric current of the fuel cell, wherein
after a start of the FC auxiliary machine, when it is determined that the fuel cell starts power generation based on a measurement value of the FC current sensor, in the second operation, the controller is configured to set the output voltage on the step-down side of the DC-DC converter to a higher voltage than a maximum value in an allowable voltage range of the low-voltage secondary battery.

12. The fuel cell system according to claim 11, further comprising:
an ambient temperature sensor configured to measure ambient temperature, wherein the controller is configured to stop the fuel cell system after charging the low-voltage secondary battery such that the voltage of the low-voltage secondary battery reaches a maximum value in an allowable voltage range of the low-voltage secondary battery, when the measured ambient temperature is lower than a predetermined temperature.

13. The fuel cell system according to claim 10, further comprising:
an ambient temperature sensor configured to measure ambient temperature, wherein the controller is configured to stop the fuel cell system after charging the low-voltage secondary battery such that the voltage of the low-voltage secondary battery reaches a maximum value in an allowable voltage range of the low-voltage secondary battery, when the measured ambient temperature is lower than a predetermined temperature.

14. The fuel cell system according to claim 1, further comprising:
an FC current sensor configured to measure electric current of the fuel cell, wherein
after a start of the FC auxiliary machine, when it is determined that the fuel cell starts power generation based on a measurement value of the FC current sensor, in the second operation, the controller is configured to set the output voltage on the step-down side of the DC-DC converter to a higher voltage than a maximum value in an allowable voltage range of the low-voltage secondary battery.

15. The fuel cell system according to claim 14, further comprising:
an ambient temperature sensor configured to measure ambient temperature, wherein the controller is configured to stop the fuel cell system after charging the low-voltage secondary battery such that the voltage of the low-voltage secondary battery reaches a maximum value in an allowable voltage range of the low-voltage secondary battery, when the measured ambient temperature is lower than a predetermined temperature.

16. The fuel cell system according to claim 1, further comprising:
an ambient temperature sensor configured to measure ambient temperature, wherein the controller is configured to stop the fuel cell system after charging the low-voltage secondary battery such that the voltage of the low-voltage secondary battery reaches a maximum value in an allowable voltage range of the low-voltage secondary battery, when the measured ambient temperature is lower than a predetermined temperature.

17. A fuel cell system, comprising:
a fuel cell;
an FC auxiliary machine used to supply fuel or gas to the fuel cell to cause the fuel cell to generate electric power;
a high-voltage secondary battery configured to supply electric power to the FC auxiliary machine;
a low-voltage secondary battery configured to have a lower output voltage than a voltage of the high-voltage secondary battery;
a DC-DC converter configured to step down the voltage of the high-voltage secondary battery and supply the stepped-down voltage to the low-voltage secondary battery;
a loading device connected between the low-voltage secondary battery and the DC-DC converter;
a temperature sensor configured to measure temperature of the high-voltage secondary battery; and
a controller used to start the fuel cell system, wherein the controller is configured to perform
(i) a first operation to set an output voltage on a step-down side of the DC-DC converter to a higher voltage than the voltage of the low-voltage secondary battery and subsequently start the FC auxiliary machine using the electric power from the high-voltage secondary battery, when the temperature of the high-voltage secondary battery obtained from the temperature sensor is higher than a predetermined reference value; and
(ii) a second operation to keep operation of the DC-DC converter at stop or to separate the DC-DC converter from the low-voltage secondary battery by means of a relay and subsequently start the FC auxiliary machine using the electric power from the high-voltage secondary battery, when the temperature of the high-voltage secondary battery obtained from the temperature sensor is equal to or lower than the predetermined reference value.

18. The fuel cell system according to claim 17,
wherein in the first operation, the controller is configured to set the output voltage on the step-down side of the DC-DC converter to a higher voltage than a maximum value in an allowable voltage range of the low-voltage secondary battery.

19. The fuel cell system according to claim 18, further comprising:
an ambient temperature sensor configured to measure ambient temperature, wherein the controller is configured to stop the fuel cell system after charging the low-voltage secondary battery such that the voltage of the low-voltage secondary battery reaches a maximum value in an allowable voltage range of the low-voltage secondary battery, when the measured ambient temperature is lower than a predetermined temperature.

20. The fuel cell system according to claim 17, further comprising:
an ambient temperature sensor configured to measure ambient temperature, wherein the controller is configured to stop the fuel cell system after charging the low-voltage secondary battery such that the voltage of the low-voltage secondary battery reaches a maximum value in an allowable voltage range of the low-voltage secondary battery, when the measured ambient temperature is lower than a predetermined temperature.

* * * * *